April 18, 1933. H. J. P. ENEMARK 1,904,428
SPRAYING DEVICE
Filed Aug. 22, 1931
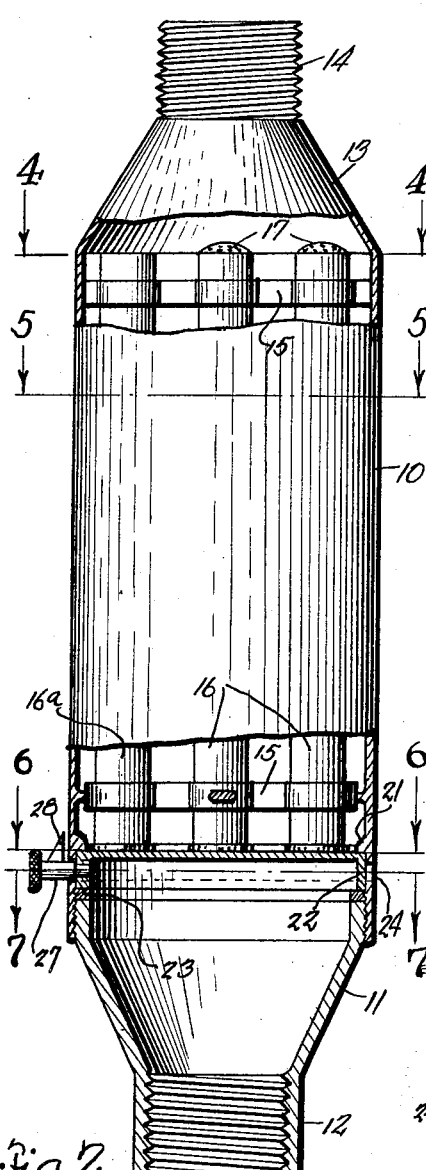
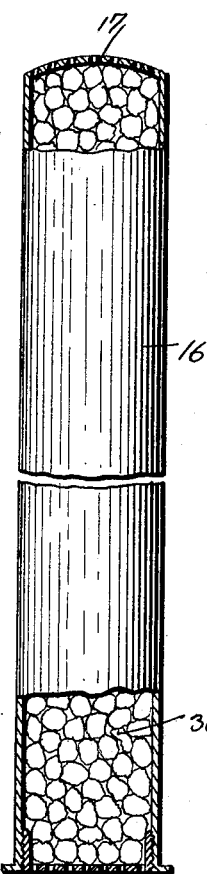
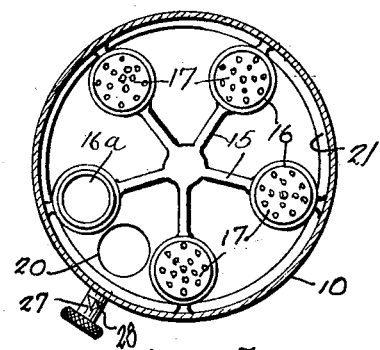
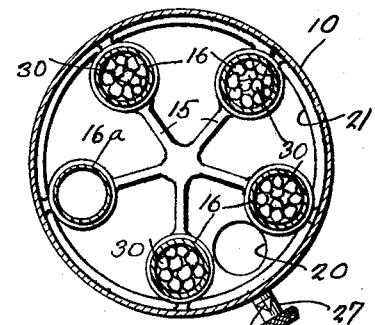
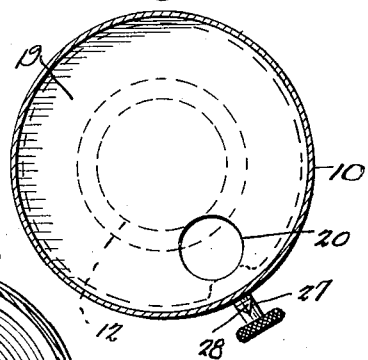
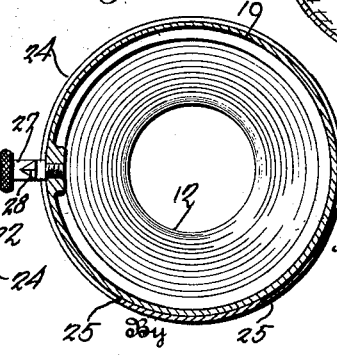
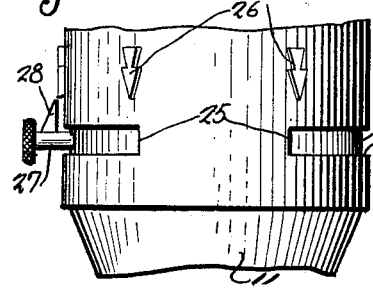
Inventor
H. J. P. Enemark,
By
Attorney Patented Apr. 18, 1933

1,904,428

UNITED STATES PATENT OFFICE

HANS J. P. ENEMARK, OF STAPLETON, NEW YORK

SPRAYING DEVICE

Application filed August 22, 1931. Serial No. 558,790.

This invention relates to certain new and useful improvements in spraying devices.

The primary object of the invention is to provide a spraying device especially designed for attachment to garden hose and constructed to cause water to flow through different channels therein and in contact with chemicals or fertilizers contained in the separate channels so that the water outletting from the spray device is impregnated with a particular chemical or fertilizer for a special use such as in the spraying of rose bushes and the like with a nicotine solution, the spraying of fruit trees with a solution containing arsenate of lead or a solution for a garden containing paris green as well as a fertilizer solution for general purposes.

A further object of the invention is to provide a spray device of the foregoing character wherein a casing adapted for attachment to a garden hose has a plurality of non-communicating tubular members therein with a rotatable valve disk for directing the flow of water from the hose through a desired tubular member, all but one of which contains different chemicals for use in spraying lawns, gardens, flowers, shrubbery, trees, etc., the chemicals being preferably in the form of soap balls made from whale soap with other ingredients or chemicals embodied therein of a desired density so that water flowing thereover will carry off a proper mixture or solution for the treatment of plants and the like, the one tubular member providing for the flow of clear water.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view, partly in section of a spray device constructed in accordance with the present invention, showing the rotatable disk valve controlling the flow of water through the several tubular members within the spray casing;

Figure 2 is a fragmentary side elevational view showing the annular casing slot through which the disk handle extends;

Figure 3 is a side elevational view, partly in section of one of the tubular members containing chemicals;

Figure 4 is a cross-sectional view taken on line 4—4 of Figure 1, showing the perforated upper ends of the tubular members with one tubular member permitting unobstructed flow of water therethrough and the valve disk positioned to prevent the flow of water through any of the tubular members;

Figure 5 is a cross-sectional view taken on line 5—5 of Figure 1;

Figure 6 is a cross-sectional view taken on line 6—6 of Figure 1, showing the single opening in the rotatable valve disk; and Figure 7 is a cross-sectional view taken on line 7—7 of Figure 1, showing the connection between the valve disk and the operating handle therefor.

Referring more in detail to the accompanying drawing, the spraying device includes a casing 10 having one end internally threaded for the reception of a frusto-conical end fitting 11 terminating in an internally threaded connector 12 adapted for attachment to a garden hose, faucet or other water supply device, the other end of the casing 10 being tapered as at 13 and terminating in an externally threaded connector 14 to which a spray nozzle may be attached.

A spider frame 15 is carried interiorly of the casing 10 adjacent each end for the support of a plurality of tubular members 16 arranged in circular series and extending longitudinally of the casing as illustrated in Figure 1, all but one of the tubular members having a perforated head 17 while the inner end thereof is internally threaded for the reception of a perforated closure plug 18 that is positioned therein by the use of an ordinary spanner wrench or the like, the one tubular member 16a being open at both ends for purposes presently to appear.

A disk valve 19 having a single valve opening 20 therein is rotatably mounted within the inner end of the casing 10 and is engaged with abutment lugs 21 carried by the inner face of the casing, the disk valve 19 carrying a depending annular skirt 22 with the edge thereof engaged with a gasket 23 that in turn is engaged by the inner end of the fitting 11. The disk valve 19 is maintained in frictional engagement with the inner ends of the tubular members 16 and 16a and is adapted to be rotated to cause the valve opening 20 to be moved into registration with any one of the tubular members, or in partial registration therewith to control the flow of water through the tubular member and to accomplish this rotatable adjustment of the disk valve, the casing 10 in line with the annular skirt 22 of the disk valve 19 is circumferentially slotted as at 24 with the adjacent ends of the slot terminating in spaced relation as indicated at 25. The outer face of the casing 10 carries indicators, such as arrows 26 in line with each internal tubular member 16 with suitable indicia thereon indicating the character of chemical contained in the associated tubular member. A handle 27 is carried by the annular skirt 22 and extends through the circumferentially extending slot 24 and said handle carries an indicator point 28 that cooperates with the indicator 26 to determine the position of the valve opening 20 in the disk valve 19 relative to a tubular member, the handle 27 being alined with the valve opening 20.

The tubular member 16a is open at both ends while the tubular members 16 have their outer ends closed by perforated heads 17 while the inner ends have perforated removable closure plugs 18 and as shown in Figures 3 and 5, suitable chemicals 30 are placed in the tubular members 16 and these chemicals may be of any desired form and character for the purposes intended, it being preferable to provide balls made of whale soap and treated with a desired chemical and possessed of a desired density so that water flowing thereover will carry off the proper quantity of chemical or insecticide. When it is desired to use clear water for spraying lawns and the like, the valve disk 19 is shifted to position the valve opening 20 in line with the cylinder 16a and the valve disk closes the inner ends of the other tubular members 16 and the quantity of water flowing through the spraying device may be regulated by the position of the valve opening relative to an associated tubular member as will at once be apparent from an inspection of Figures 4 and 5 the flow as to quantity being dependent on the size of the passage between the valve opening and the tubular member, which can be regulated by partial opening or closing of the passage through the rotation of the valve.

It may be noted that when the valve is out of registry with the tubular members, as shown in Fig. 5, water may still flow through the casing, but can, and usually will be stopped by the supply. It is also possible to substitute a fertilizing substance for the chemically treated soap so that fertilizer may be advantageously sprayed upon flowers, shrubbery, or lawns, or wherever desired.

While there is herein shown and described the preferred embodiment of the present invention, it is nevertheless to be understood that minor changes may be made therein without departing from the spirit and scope of the invention as claimed.

I claim:—

1. A spray device of the character described, comprising a cylindrical casing open at both ends and provided with means of connection to a water supply and to a spray nozzle; a circular series of tubular members supported within and longitudinally of said casing, a plurality of said members having perforated end closures, a rotary disk valve mounted within said casing adjacent the inner ends of said members, and transversely of the axes thereof, said valve being formed with an opening located at the same distance as said members from the center of the casing and adapted to register axially with each or any of said members according to the position of the valve, means externally of the casing for rotating said valve, the latter being constructed and arranged to form a closure for all the tubular members when the valve is in closed position and the casing therein out of registry with the said members.

2. A spray device according to claim 1 in which there is provided means for indicating the position of the valve with respect to the opening through the valve.

3. A spray device of the character described, comprising a cylindrical casing open at both ends and provided with means of connection to a water supply and to a spray nozzle; a circular series of tubular members supported within and longitudinally of said casing, a plurality of said members having perforated end closures, a rotary disk valve mounted within said casing adjacent the inner ends of said members, and transversely of the axes thereof, said valve being formed with an opening located at the same distance as said members from the center of the casing and adapted to register axially with each or any of said members according to the position of the valve, means externally of the casing for rotating said valve, the latter being constructed and arranged to form a closure for all the tubular members when the valve is in closed position and the opening therein out of registry with the said members, means for indicating the position of the valve with respect to the opening through the valve, said valve being formed with a peripheral flange provided with an operating stem and the casing formed with a circumferential slot through which said stem projects.

4. A spray device according to claim 1 in which certain of the tubular members are provided at one end with detachable perforated end walls.

In testimony whereof I affix my signature.

HANS J. P. ENEMARK.